Jan. 8, 1924. 1,480,284
C. MIGNEREY
ICE CREAM CONE MACHINE
Filed Aug. 17, 1921 4 Sheets-Sheet 1

INVENTOR:
Charles Mignerey
By E J Andrews
Att'y.

Jan. 8, 1924.  
C. MIGNEREY  
ICE CREAM CONE MACHINE  
Filed Aug. 17, 1921

1,480,284

4 Sheets-Sheet 2

INVENTOR:  
Charles Mignerey  
By E. J. Andrews  
Att'y

Jan. 8, 1924.

C. MIGNEREY 1,480,284

ICE CREAM CONE MACHINE

Filed Aug. 17, 1921

4 Sheets-Sheet 3

INVENTOR:
Charles Mignerey
By E J Andrews
Att'y.

Patented Jan. 8, 1924.

1,480,284

UNITED STATES PATENT OFFICE.

CHARLES MIGNEREY, OF UNION COURSE, NEW YORK, ASSIGNOR TO CONSOLIDATED WAFER COMPANY, OF BROOKLYN, NEW YORK, A CORPORATION OF NEW YORK.

ICE-CREAM-CONE MACHINE.

Application filed August 17, 1921. Serial No. 492,905.

*To all whom it may concern:*

Be it known that I, CHARLES MIGNEREY, a citizen of the United States, residing at Union Course, in the county of Queens and State of New York, have invented certain new and useful Improvements in Ice-Cream-Cone Machines, of which the following is a specification.

This invention relates to machines for making ice-cream cones and similar articles; and it relates particularly to the molds in which the cones are formed. It has for its objects means for strengthening the molds without increasing the mass of the molds to an undesirable amount, so that they will receive without injury a very high pressure in forming the ice-cream cones, and also to provide means in connection with the molds for allowing the escape of gases, particularly air and steam from the cone batter while the cones are being formed under high temperatures, and without allowing any material amount of batter itself to escape. Further objects are to provide suitable means for manipulating the molds while the cones are being removed from the molds; and also means for cleaning the molds of any surplus portions of batter after the cones are removed.

Figure 2:
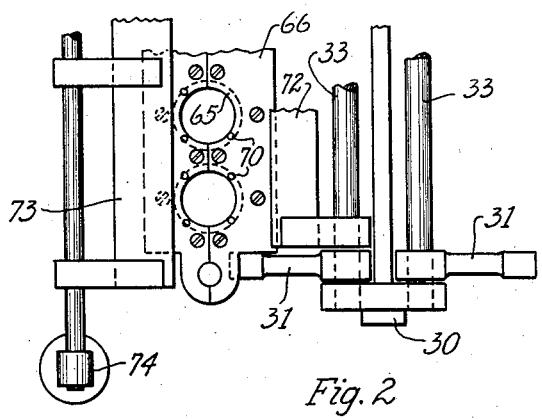
Figure 1:
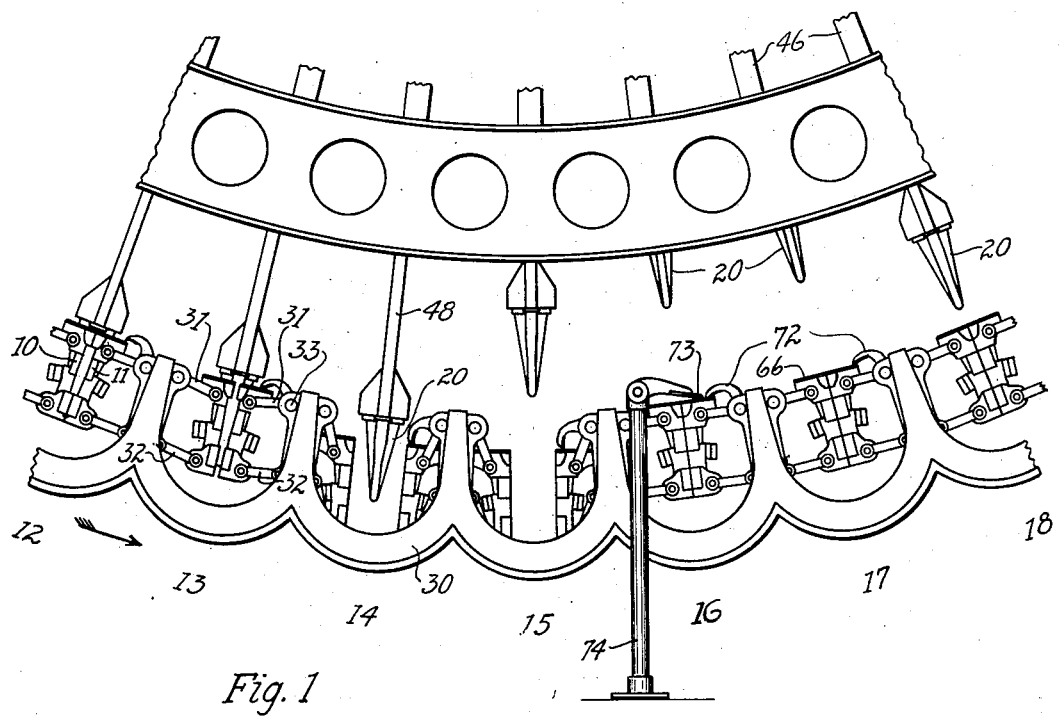
Figure 3:
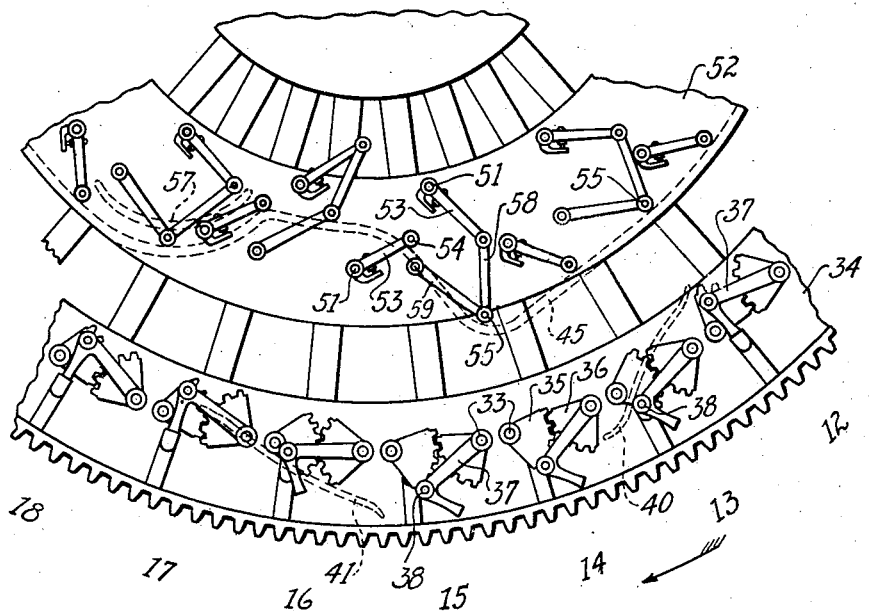
Figure 6:
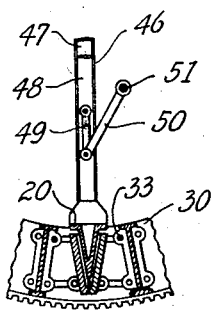
Figure 4:
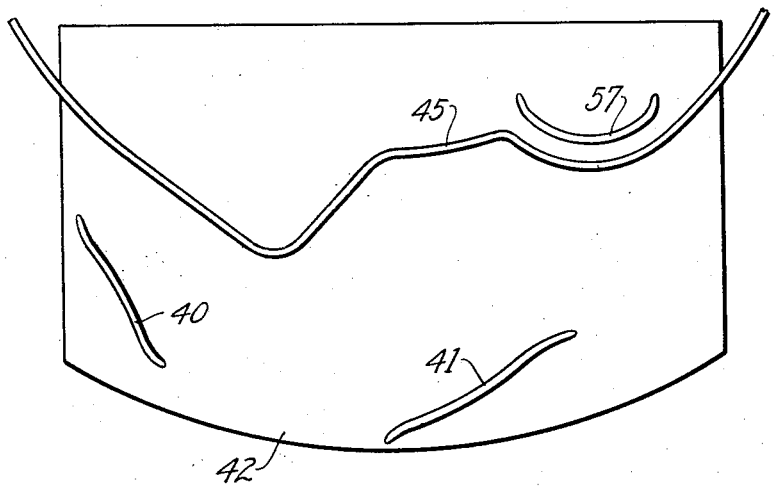
Figure 5:
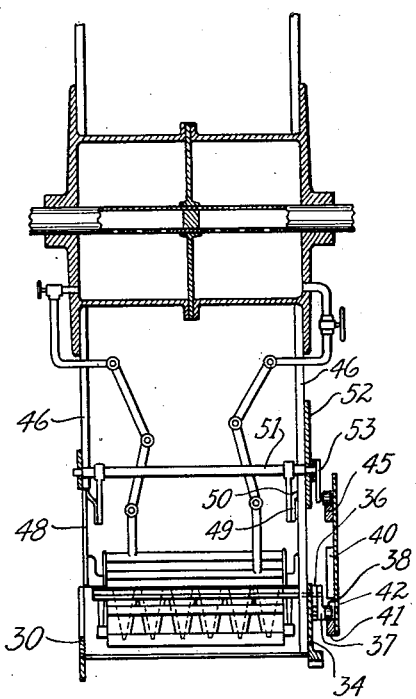
Figure 7:
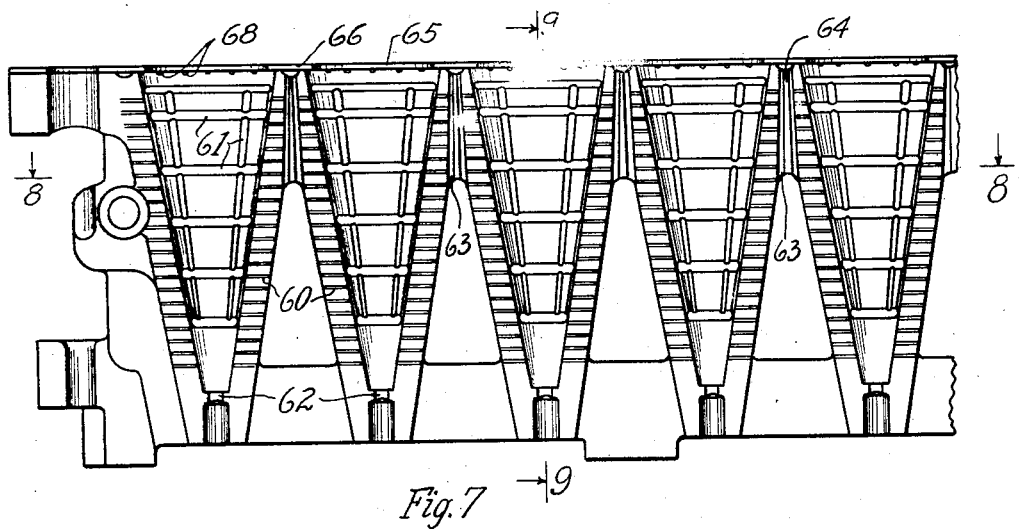
Figure 8:
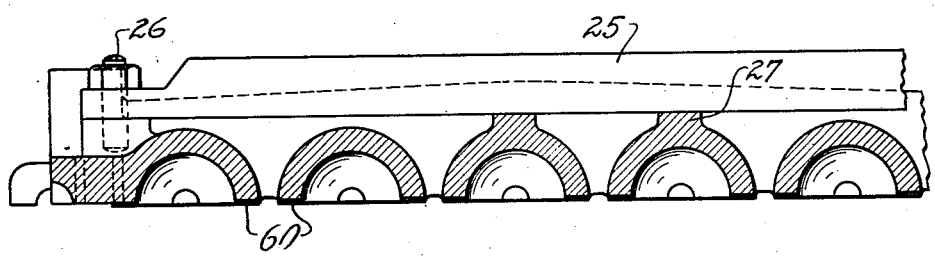
Figures 9, 10:
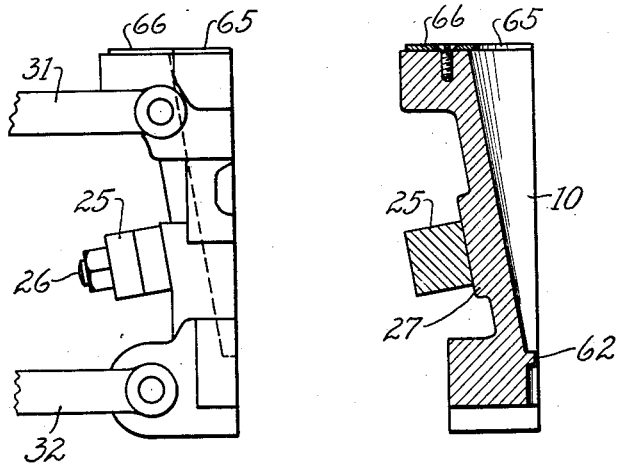

Of the accompanying drawings Fig. 1 is a fragmental elevation of an ice-cream cone molding machine, which embodies the features of my invention, when viewed from one side of the machine; Fig. 2 is an enlarged detail plan view of a portion of the mold operating means of said machine; Fig. 3 is a fragmental elevation of another portion of the machine, when viewed from the other side of the machine, showing mechanism for operating the molds and means for operating the mold cores; Fig. 4 is an elevation of a cam plate with cams for cooperating with the mechanism of Fig. 3; Figs. 5 and 6 are fragmental sectional views of portions of the mold operating mechanism; Fig. 7 is an enlarged elevation of a bank of cone mold sections; Fig. 8 is a sectional view along the line 8—8 of Fig. 7; Fig. 9 is a sectional view along the line 9—9 of Fig. 7; and Fig. 10 is an end elevation of the cone mold sections.

My invention may be applied to any suitable form of ice-cream cone molding machines, particularly to the vertically rotating type of machine. Inasmuch as the greater portion of the machine itself has no material bearing on my invention. I have shown herein only those portions thereof which are more or less material. A suitable machine for the application of my invention, however, is disclosed in the Patent No. 1,122,913, issued to J. P. Groset, on Dec. 29, 1914, and reference may be had to this patent for any particulars relating to the machine which are not described herein, including the cone-baking mechanism illustrated in Fig. 5. It is to be understood, however, that my invention should not be confined to the particular machine disclosed in said patent, nor to the particular type of molds or mold operating means described therein; but it is applicable to other types of machines and molds, and modifications in the details described herein, with reference to the novel features which I have invented, may be made by those skilled in the art without departing from the spirit of my invention as disclosed by the claims herein.

It is common with the machines of the vertically rotating type to have the molds formed in banks of several molds. In the case of the patent referred to there are six molds in each bank, and the banks are divided longitudinally through the center into two sections, Fig. 7. Hence, each mold is formed in two sections so that the molds may be opened and the cones removed after the cones are baked. When the molds are opened the cores, which coact with the molds to form the interior portions of the cones, are elevated out of the way; the mold sections are then brought together; the cone batter is then introduced into the molds; the cores are then forced down into the batter, forming the cones; and the molds are then heated to bake the batter. During all of this process the molds are continuously revolving around the common center.

In the machine, portions of which I have illustrated, the mold sections 10 and 11, when in the position 12, Fig. 1, and moving in the direction of the arrow, are closed and the cones are then baked and ready to be removed. In passing from the position 12 to 13 the molds begin to open, and in position 14 they are fully opened. In position 15 the molds are closing, and in position 16 they are fully closed. In the meantime the baked cones have dropped from the molds into suitable receiving receptacles, not shown. While in the positions 16 and 17 the cores 20 are held a material distance above the molds, and the batter, by suitable means, not shown, is introduced into the molds, and the cores then descend as the position 18 is reached, and finally the cores pass entirely into the molds and remain there until position 12 is again reached.

As the machines are usually large, and include a very large number of banks of molds and cores, all of which have to be continuously rotated, it is desirable to make the parts as light as is consistent with the strength required. In order to decrease the mass of banks of mold sections I prefer to make them of aluminum; and in order to reduce to a minimum the thickness of the walls of the molds I provide means for stiffening the central portions of the sections upon which the greatest stress comes during the molding process of the cones, it being understood, that when the cores are forced into the molds a very material pressure is produced by the cone batter on the sides of the molds. A novel feature which I introduce to strengthen the mold sections consists of a bar 25, Fig. 10, or other suitable device, the ends of which are fastened to the ends of the sections by means of bolts 26, or in any other suitable manner, the bars extending across the central portion of the sections, and being drawn by the bolts snugly against the bosses 27 on the walls of the molds in the central portion of the sections, so as to prevent springing of the molds when under pressure.

An annular framework 30, extending in a vertical plane entirely around the machine, supports the mold sections by means of links 31 and 32 which are pivoted to the framework and also to the mold sections. Through these links the contiguous faces of the mold sections 10, 11 are maintained parallel in their opening and closing movements. The links 31 are pivoted to the frame 30 by means of shafts 33 to which the links 31 are non-rotatably fixed. The shafts 33 extend outwardly through the ring 34 and each one has fixed to its outer end a gear sector 35 or 36. These sectors are in pairs which mesh with each other and the two shafts 33, operated by each pair of sectors, control the opening and closing of one bank of molds. One of the shafts of each pair 33 has an arm 37 fixed thereto, and the outer end of the arm carries a cam-roller 38, which is adapted to be engaged and moved by the cams 40 and 41. These cams are fixed to the cam-plate 42 which is immovably fixed to the frame of the machine, immediately outside of the gear sectors and arms 37, so that the cams 40 and 41 face the ring 34 and coact with the rollers 38.

As the mold sections are rotated from position 12 to 13 the cam 40, acting on the adjacent roller 38, operates the shaft 33 and turns downwardly the links 31, thus moving the mold sections endwise and sidewise along and away from the cores and also away from each other, the contiguous faces of the mold sections remaining parallel because of the links 31, 32. The effect of such compressed movement is to strip the baked cones longitudinally away from the cores and permit them to drop by gravity from between the molds into a suitable receptacle, not shown. Preferably, the cores have a slight movement into the space between the opened mold sections, as shown at position 14, for the purpose of detaching any cones that may adhere to either of them.

The bank of cores are manipulated in the following manner: The cam-plate 42 carries also cams 45 and 57, which are adapted to operate the cores in a suitable manner. Each pair of radial arms 46, which supports the banks of cores 20, has grooves 47 (Fig. 6) which form guides for members 48 which are connected to the ends of the bank of cores. Links 49 are pivoted to the members 48 and the arms 50. Each arm 50 is fixed to a shaft 51 which passes through and is journaled in the ring 52. Outside of the ring 52 are arms 53 which are adjustably fixed to the shafts 51. The shafts 51 for convenience are journaled in the ring 52 in staggered relation to each other, forming an outer and an inner circle of shafts. The arms 53 that are connected with the outermost of said shafts 51 are provided on their free ends with rollers 54 which are arranged to be engaged by the cams 45 and 57, so as to move the arms 53 and impart radial movement to the shafts 51 to raise and lower the banks of cores 20, by means of the arms 50 and links 49. The arms 53 that are connected with the innermost of said shafts 51 are pivoted to links 58 that are pivotally secured to the ring 52, by means of links 59, and the other cam-rollers 55 are pivoted to the arms 58 at their point of connection with the links 59. Hence, when the cam-rollers 55 are moved, by contact with the cam surfaces 45 or 57, rotary movement will be imparted to the inner shafts 51, and the cores 20 connected thereto will be raised or lowered. The particular arrangement of the cams 40, 41, 45 and 57, determines the relative movement of the mold sections and the cores; and by arranging these cam sections substantially as indicated in Fig. 4, the relative movement of the mold sections and cores hereinabove described will be produced.

It has been found in the manufacture of ice-cream cones that, when the moist batter is in the heated molds, much steam is generated, and there is a tendency for this steam, and sometimes for more or less to form bubbles in the batter, and particularly in the walls of the ice-cream cones which are being formed. This is objectionable not only because of the injury to the appearance or strength of the walls of the cones, but also because the steam tends to force the batter itself out of the molds, making it necessary to trim the cones after they are baked, and being otherwise objectionable. It is to be understood, by the use of suitable batter feeders, one of which is disclosed in the above mentioned patent, it is possible to feed batter to the molds in substantially the exact quantities necessary to properly form the cones; and if provision is made for excluding from the molds all of the gases such as steam and air, when the cones are being formed, and by properly adjusting the feeder so that exactly the right amount of batter is passed into the molds, the cones may be formed without defects, and the batter will be entirely used up without any material amount being forced from the molds; and hence no batter is wasted or no trimming or other undesirable operations are necessary after the cones are baked.

In order to provide for the exclusion of steam or other gases from the molds I provide a large number of small openings through certain portions of the walls of the molds. These openings may be formed in any suitable manner or place in the walls of the molds. I prefer to provide slots 60 in the edges of the mold sections which come in contact with each other when the sections register. These slots may be formed in the edges of both coacting sections, alternating or not as may be desired; but for convenience in manufacturing I prefer to form them in the edges of the walls of one set of mold sections only, making the slots large enough for the purpose of allowing the steam to pass out, but so small that little if any batter will be forced through. The exact size of space between the slots is not very material but I prefer to form the slots about one-half inch apart and about one thirty-second of an inch wide and deep. However, I do not wish to be confined to any particular size of slots or space between them.

In operation, as the plunger is forced downwardly into the molds, and into the batter contained therein, as the batter is forced into contact with the hot walls of the mold the moisture contained therein is turned into steam. The pressure due to the plunger compresses the steam, but, as the batter itself is very porous, the steam flows freely through the batter and then out through the various outlets formed in the walls of the molds. There is more or less tendency for the batter itself to be forced through the outlets, but, as it is far more coherent than the steam, the steam much more readily passes out and reduces the pressure on the batter and prevents its being forced out. At the same time, as soon as the batter is forced snugly against the walls, although slight amounts may enter the slots, the heat bakes the batter and prevents its being forced outwardly any farther. So that the steam or other gases are excluded and the batter is retained.

While the steam outlets may be formed in other portions of the walls, I prefer to confine them to the edges of the sections as stated, and the grooves 61 in the molds provide passageways for the steam to reach the outlets. At the bottom of the molds, in order to allow the steam to escape, I provide a slight clearance 62 between the edges of the two sections, so that when the sections are registering a very narrow slot is formed in the bottom of the mold which allows the steam to escape. As there is a tendency for the escaping steam to pass through the wall of one mold into the steam outlets of the adjacent mold, especially near the upper ends where the walls of the molds are joined, I provide slots 63 which allow the steam to escape freely, and the central ridges 64 prevent the steam from passing from one groove to the other. At the same time the central ridges prevent any tendency of the batter to be forced from the two adjacent molds and thus binding the two cones together. Further it is to be understood that the steam outlets are so small that if any batter passes therein, the thread of the batter thus formed, when the cones are removed from the molds, will be so weak as to be brushed off by the ordinary manipulation of the cones, and hence are not objectionable.

One of the features of my invention consists in providing certain improvements which allow the molds to be made out of aluminum. It is desirable to provide a flange 65 projecting inwardly around the upper ends of the molds to prevent the batter from being forced upwardly out of the molds; and it is usual to make this flange project across the top of the cone substantially to the cores. It has also been common to make this flange integral with the molds. I prefer, however, to provide a flange by means of plate 66 fixed to the upper end of the mold sections and projecting over the edge of the molds so as to form a suitable flange when the two mold sections are coacting. The use of this attached plate allows more convenient machining of the molds before the plate is attached, as otherwise the flange would interfere; and it materially strengthens the flange for equal thicknesses, as it allows the use of a stronger material such as steel; and it also allows the use of a material having a coefficient of expansion unlike that of aluminum, and also having a lower rate of heat conduction than aluminum. It is desirable to use aluminum for the molds and also for the cores, not only because of its relative lightness, but also because of its greater heat conductivity, than other available metals such as iron or steel. As the heat must be conducted through the walls of the molds and cores to the batter it is of course desirable to have a material which will conduct the heat as readily as possible. However, the flange at the upper end of the molds should be of a lower conductivity so as to conduct the heat away from the batter more slowly. This flange, also being subject to varying temperatures during the molding process, is preferably made of a material of a lower coefficient of expansion, so that the space between the core and the inner margin of the flange, when the mold is forming, may not vary too greatly. I desire to have the inner surface of the flange spaced slightly away from the core, so as to avoid contact with the core, and also to provide a slight space for the escape of steam. But if the coefficient of expansion is too great, it will be found that this space varies too much because of the variations in temperature of the flange caused by various local or temporary conditions. Although this clearance between the margin of the flange and the core may be varied to suit the particular needs, I prefer to form the flange with reference to the mold so that the clearance at this point, as the cones are forming, shall be substantially one one-thousandth of an inch.

I provide steam outlets at the upper ends of the molds by forming slots 68 in the upper edges of the walls immediately beneath the plates 66, and other suitable steam outlets may be formed.

Inasmuch as at times there is necessarily a slight surplus of batter which must be forced from the molds, I provide for this by forming openings 70 in the plate 66. These openings are spaced a slight distance apart and are of such a size, that, not only may the steam escape easily through them, but the batter also will be forced through in case of any surplus; and the walls of the passageways will not be sufficiently massive or long as to prevent the flowing out of the batter without baking, especially when a substance of lower conductivity than aluminum is used. So that the surplus batter, if any, is thus allowed to escape, and thus undue pressure on the walls of the molds, or undue forcing of the batter through the steam outlets, is prevented.

Means are also provided for cleaning from the plates 66 any surplus batter which may be forced thereon in the manner hereinabove described, after the cones are removed from the molds. I provide for this purpose the scrapers 72, which are pivoted at their ends to the mold supporting frames 30, and are arranged so that, as the mold sections are separating and the cones are being removed therefrom, the scrapers will scrape off the plates on the forward sections of the molds, each bank of molds having its own scraper for this purpose. As the mold sections advance and are raised in the manner hereinabove described, a scraper 73 scrapes off any surplus batter from the sections, particularly from the rear sections, this scraper 73 being universal and operating on all of the mold sections. The scraper 73 extends across the bank of mold sections and is pivoted at its ends to the fixed support 74 or in any other suitable manner.

I claim as my invention:

1. In an ice-cream cone machine two rows of coacting cone sections, stiffening means extending longitudinally along the outer side of each cone section, and means for pressing the said stiffening means snugly against the central portion of the said side.

2. In an ice-cream cone machine two rows of coacting cone sections, stiffening means extending longitudinally along the outer side of each cone section, and means for pressing the said stiffening means snugly against the central portion of the said side said cone sections being composed of aluminum.

3. In an ice-cream cone machine a mold for forming cones, a core for said mold and arranged to be pressed therein, and a detachable flange extending inwardly around the upper edge of said mold.

4. In an ice-cream cone machine a mold for forming cones, a core for said mold and arranged to be pressed therein, and a detachable flange extending inwardly around the upper edge of said mold, said flange being composed of a material having a lower heat conductivity and coefficient of thermal expansion than said mold.

5. In an ice-cream cone machine a mold, a core for said mold, and a flange extending inwardly around the upper edge of said mold, the magnitudes and the coefficients of expansion of said elements being such that when a cone is forming in said mold there will be a space of about one-one-thousandth of an inch between the said cone and the inner margin of said flange.

6. In an ice-cream cone machine a mold for the cones having a flange extending inwardly around its upper edge, said flange having openings therethrough by means of which steam and surplus batter may escape from the mold as the cone is forming.

7. An ice-cream cone mold comprising two registering sections, the edge of one of the sections which comes in contact with the edge of the other section having a plurality of small transverse grooves extending clear across the said edges, whereby small openings are formed in the wall of the mold when the sections are in contact.

8. In an ice-cream cone machine, a mold comprising two separable sections, a frame supporting said mold, means for separating said sections, and a scraper pivotally connected to said frame, the edge of said scraper normally resting on the end of one of said mold sections, whereby when said sections are separated said scraper will scrape the end of the section on which the scraper rests.

9. In an ice-cream cone making machine, a mold and scraper substantially as set forth in claim 8, and an additional scraper for scraping the end of the other section of said mold.

10. In an ice-cream cone machine a plurality of banks of cores arranged to revolve about a common center, a scraper pivotally associated with each bank of cores and revolving therewith, and means for moving the edge of each scraper across the open ends of the molds with which the scraper is associated after the baked cones are removed from the cores.

11. In an ice-cream cone machine a plurality of molds revolving about a common center, each of said cones comprising two sections, a scraper movably associated with each of said molds, means for separating each pair of said mold sections as they move by a certain place and for moving said scraper across the end of one of the sections of the pair, and a common non-revolvable scraper arranged to scrape the end of each of the other sections of each pair as the section moves by the said common scraper.

In testimony whereof, I hereunto set my hand.

CHARLES MIGNEREY.